Feb. 24, 1970     J. S. PAGE, JR     3,497,004
TUBING TO TUBING FLOW CONTROLLING RETRIEVABLE SUB-SURFACE VALVE
Filed May 25, 1967     4 Sheets-Sheet 1
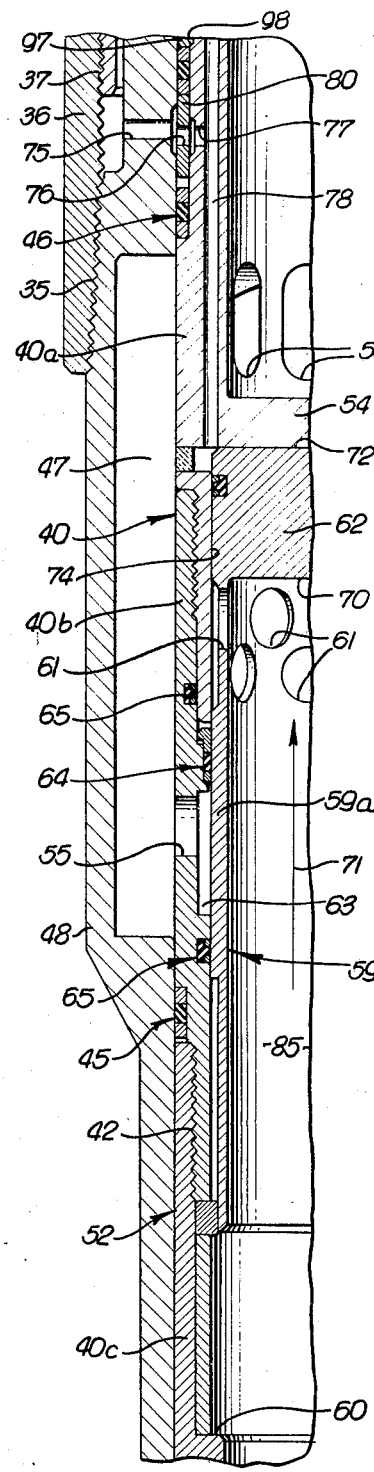
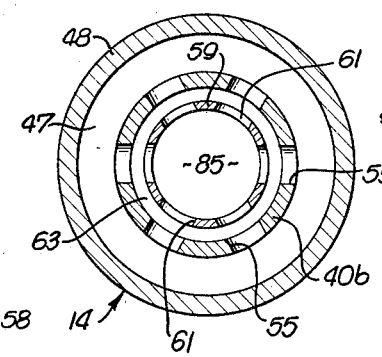
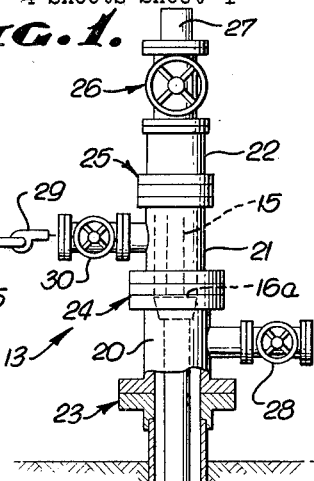
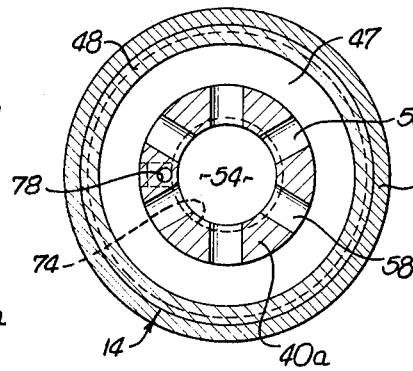
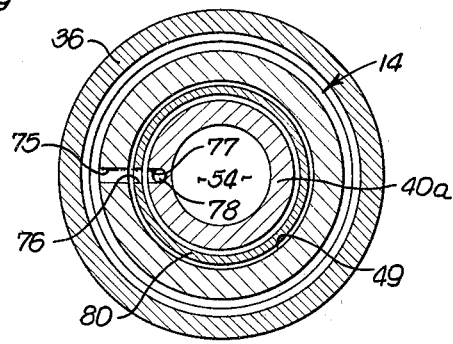
INVENTOR.
JOHN S. PAGE, JR.
By White & Haefliger
ATTORNEYS.

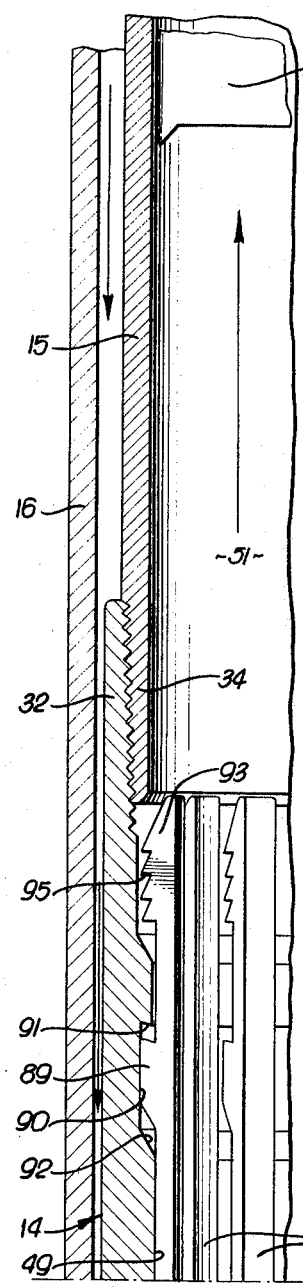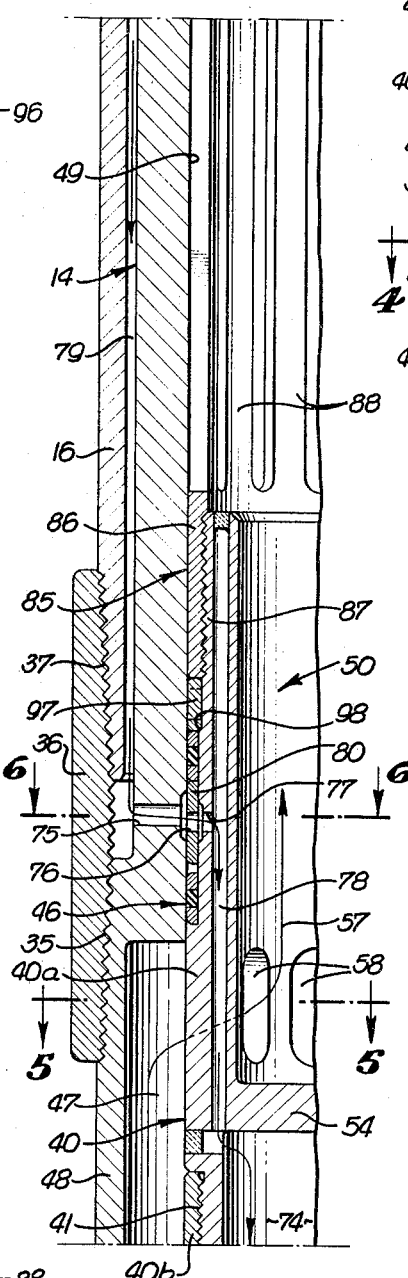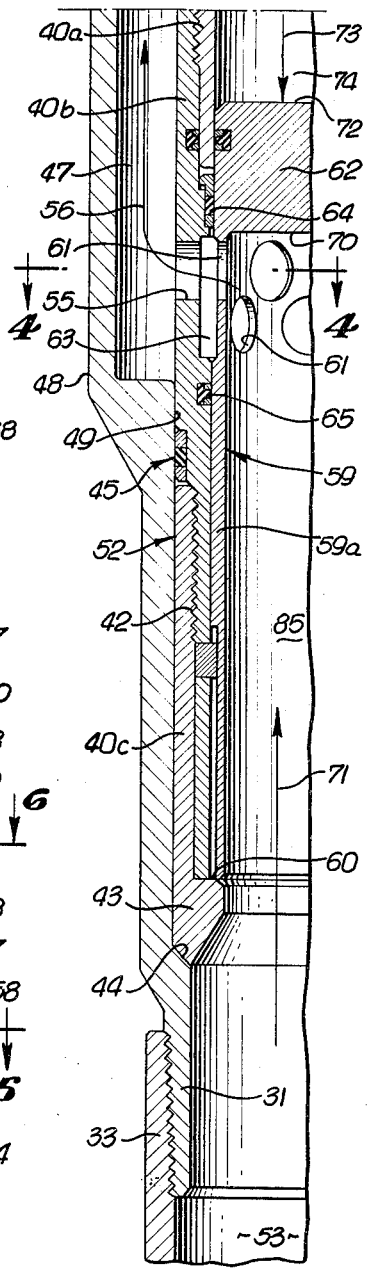

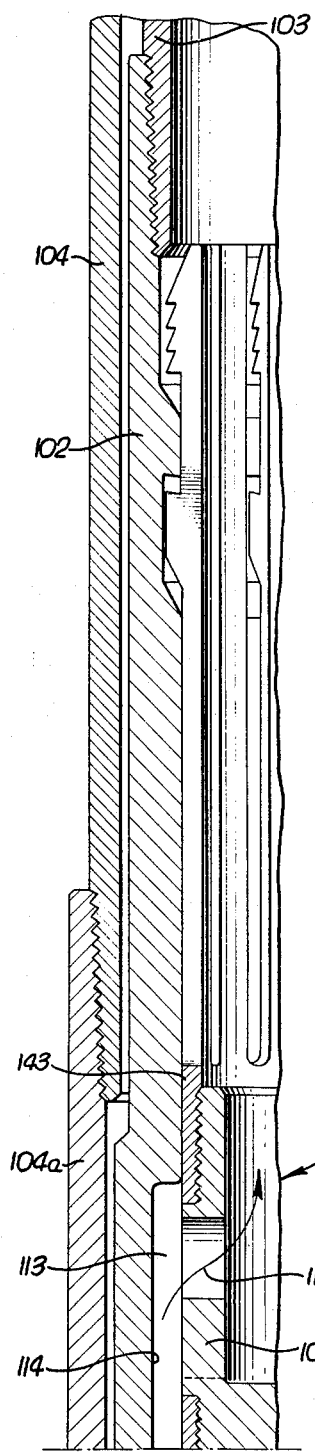

Feb. 24, 1970    J. S. PAGE, JR    3,497,004
TUBING TO TUBING FLOW CONTROLLING RETRIEVABLE SUB-SURFACE VALVE
Filed May 25, 1967    4 Sheets-Sheet 4
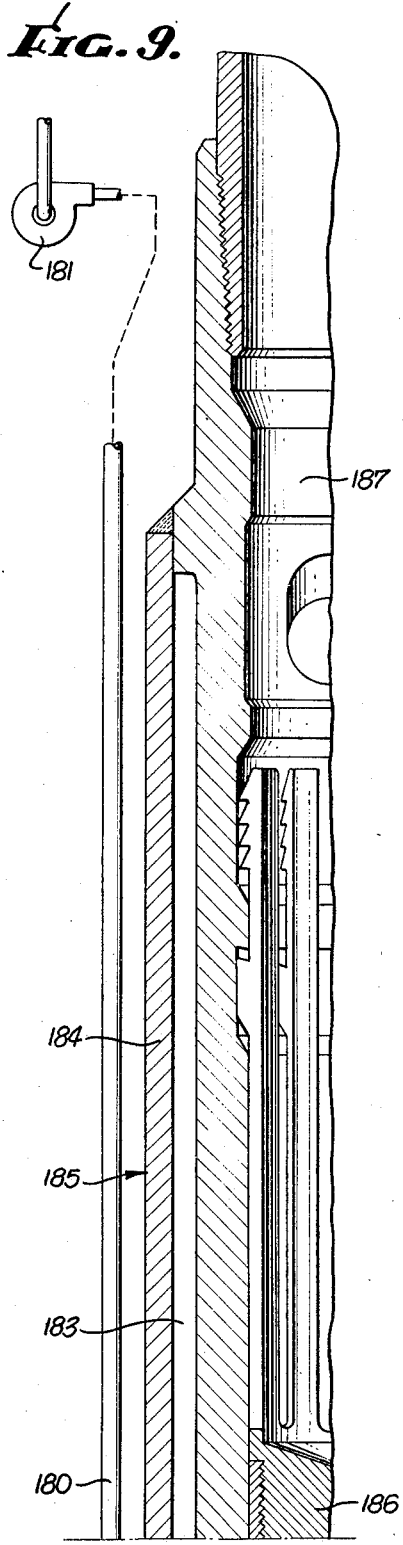
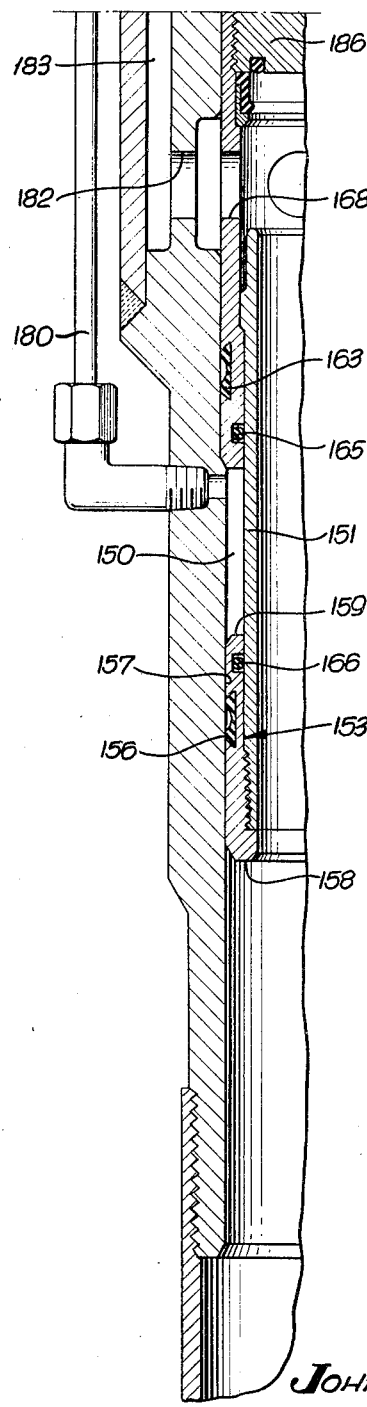
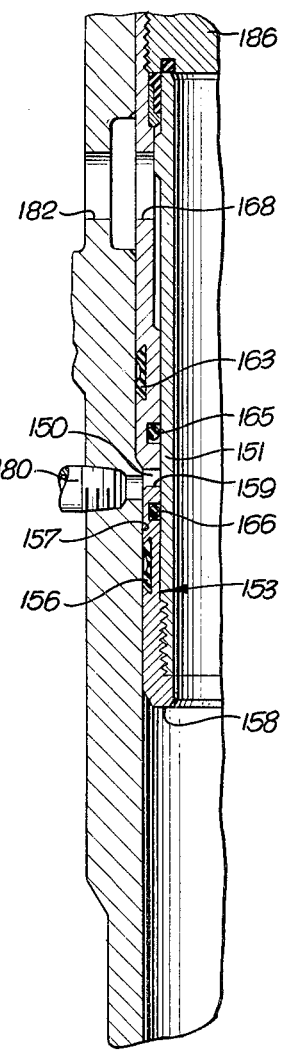
INVENTOR.
JOHN S. PAGE, JR.
By White & Haefliger
ATTORNEYS.

United States Patent Office 3,497,004
Patented Feb. 24, 1970

3,497,004
TUBING TO TUBING FLOW CONTROLLING RETRIEVABLE SUB-SURFACE VALVE
John S. Page, Jr., Long Beach, Calif., assignor to Cook Testing Co., Long Beach, Calif., a corporation of Nevada
Filed May 25, 1967, Ser. No. 641,323
Int. Cl. E21b 33/10
U.S. Cl. 166—224                             14 Claims

ABSTRACT OF THE DISCLOSURE

The disclosed invention concerns an insert receivable downwardly in well tubing and into a tubular body in the tubing; the insert defining a barrier across the body interior and having a lower tubular portion to pass production fluid flow to the body interior above the barrier via a side port in the insert and a flow chamber exterior of the insert; and valve means carried by the insert and having piston surfaces responsive to differential pressure exerted by the production fluid and by control fluid to displace the valve means for controlling such production fluid flow through the side port.

BACKGROUND OF THE INVENTION

This invention relates generally to sub-surface well valves, and more particularly concerns fluid pressure operated sleeve valves of this type.

In the past, sub-surface valves have been built to incorporate sleeves mounted in the valve housing, the sleeves controlling well pressure flowing upwardly through bypass porting formed by housing or body structure. It is a characteristic of such valves that either the control sleeve or the port forming structure, or both, is so mounted in the string as to be irretrievable excepting upon upward removal of the tubing string. This of course is a time consuming and expensive operation; however, it may and does become necessary in order to replace a worn-out sleeve valve, or seals at the sleeve valve. Such wear may occur as a result of abrasion action of sand particles in the upward flow of production fluid.

SUMMARY OF THE INVENTION

It is a major object of the present invention to provide a solution to the above problem, through a valve construction enabling replacement of sleeve valves and seals without pulling the tubing string. Basically the apparatus of the invention, which is connectable in a string of tubing in a well, comprises an upright tubular body; an insert removably received downwardly into the body and communicating with a flow chamber exteriorly of the insert, the insert defining a barrier across the body interior and the insert having a lower tubular portion communicable with the string interior below the body and side porting to pass the production fluid flowing from within the lower tubular portion via the flow chamber; and valve means carried by the insert and having piston surfaces responsive to changes in differential pressure exerted by the production fluid and by control fluid to displace the valve means for controlling the production flow through the porting. Typically, the valve means includes a sleeve movable vertically in the lower tubular portion of the insert to block and unblock production fluid flow through the insert side porting, and piston surfaces are on the sleeve to receive application of control fluid pressure and production fluid pressure respectively urging the sleeve in opposite vertical directions. Accordingly, wire line retrieval of the insert operates to withdraw the valve means, as for example the sleeve, from the tubing for replacement of the sleeve as well as of seals operating to seal off between the sleeve and the insert or between the sleeve and the body, as will appear.

Additional objects and unusually advantageous features include the formation of the flow chamber when the insert is landed in the tubular body; the provision of a control chamber formed by the valve means and insert interiorly of the latter, the body and insert forming passages to communicate control fluid pressure to the control chamber; the provision of valve means defining a head on the sleeve blocking communication between the control chamber and the lower interior of the insert; the use of the head to close one end of the sleeve to separate the control chamber from the sleeve interior; the construction of the head to extend annularly of the sleeve, together with annular means sealing off between the sleeve or head and the insert or the valve body, facilitating retrieval of the seals; and the provision of concentric tubing strings above the valve, one to supply control fluid pressure to the control chamber and the other to conduct production fluid to the well head, as will be seen.

These and other objects and advantages of the invention, as well as the details of illustrative embodiments, will be more fully understood from the following detailed description of the drawings, in which:

BRIEF DESCRIPTION OF THE DRAWINGS

FIG. 1 is a vertical elevation showing one way in which the apparatus of the invention may be installed in a well;

FIGS. 2, 2a and 2b are enlarged vertical sections showing the construction of one form of the valve apparatus, the valve sleeve being in open position;

FIG. 3 is a view like FIGS. 2a and 2b, showing the valve sleeve in closed position;

FIGS. 4, 5 and 6 are horizontal sections taken on lines 4—4, 5—5 and 6—6 seen in FIGS. 2a and 2b;

FIGS. 7 and 7a are enlarged vertical sections showing another form of the invention;

FIG. 8 is an enlarged vertical section showing still another form of the invention;

FIGS. 9 and 9a are enlarged vertical sections showing yet another form of the invention, the valve being open; and FIG. 10 is a view like FIG. 9a showing the valve open.

DESCRIPTION OF THE PREFERRED EMBODIMENTS

Referring first to FIG. 1, a well 10, cased at 11, receives a tubing string 12 extending below the well head 13. Connected in the string is a valve body 14 from which inner and outer concentric strings 15 and 16 extend upwardly to the well head, such strings also appearing in FIG. 2. Connected in the string below the valve body are a packer 17 packing off between the body 18 and the casing bore, and slips 19 supporting the string in the well. Structure at the well head includes the tubular casing head sections 20, 21 and 22 connected at flanging 23, 24 and 25. Production fluid flowing upwardly within the casing is removable via the valve 26 and pipe 27; fluid may be pumped into or withdrawn from the annulus via valve 28 communicating therewith; and control fluid may be delivered by pump 29 and via valve 30 to the interior of the outer concentric string 16, for purposes as will appear. Note that inner string 15 extends upwardly beyond the upper terminal 16a of the outer string 16.

Extending the description of FIGS. 2, 2a and 2b, the upright tubular body 14 has threaded pin and box ends 31 and 32 connected with tubing section terminals 33 and 34. Exterior threading 35 on the body supports a collar 36 to which the outer string 16 is connected at 37.

An insert received downwardly into the body is indicated generally at 40, the insert including upper, intermediate and lower sections 40a, 40b and 40c interconnected at threads 41 and 42. The lower section terminal 43 lands at body shoulder 44 to locate the side seals 45 and 46 carried on the insert in straddling relation to a flow chamber 47 formed by the body and the insert when the latter is received in the position shown. The flow chamber is generally located within the body enlargement indicated at 48. Acordingly, the flow chamber is sealed off at its upper and lower ends by the annular side seals sealing off between the insert and the body bore 49. Each side seal may comprise an elastomer ring located between two metal rings as shown.

It is characteristic of the insert that it includes an upper tubular portion 50 communicating with the string interior 51 above the body 14 insert, and a lower tubular portion 52 communicating with the string interior 53 below the body 14. In the form of the invention being described, the tubular portions 50 and 52 are separated as by a barrier 54. In addition, the insert has side porting 55 to pass the production fluid flowing upwardly from within the lower tubular portion to the upper tubular portion via the flow chamber 47, as indicated by arrows 56 and 57. The side porting may also be considered to include ports 58 communicating between the flow chamber and the interior of the upper tubular portion.

The apparatus also includes what may be considered as valve means carried by the insert and having piston surfaces responsive to changes in differential pressure exerted by the production fluid and by control fluid to displace the valve means for controlling the production flow through the side porting. Typically, and as seen in FIGS. 2, 2a and 2b, the valve means includes a sleeve 59 movable vertically in the insert lower tubular portion 52 to block and unblock production fluid flow through the side porting 55. Thus, as seen in FIG. 2b, the sleeve in extreme down position (as limited by sleeve terminal engagement with the insert shoulder 60) has side ports 61 which pass the flow directly to the insert side ports 55; whereas as seen in FIG. 3, the sleeve in extreme up position (as limited by engagement of the head 62 on the sleeve with the underside of barrier 54) has a skirt section 59a directly opposite the ports 55 to block such flow. Note that the insert is recessed at 63 to receive flow from upper and lower rows of ports 61 in FIG. 2b, and that annular side seals 64 and 65 above and below that recess straddle it to confine the flow against unwanted leakage between the valve means (including the head 62 and the sleeve 59) and the insert. Such structure is subject to easy replacement, in accordance with the invention, due to the easy and independent retrievability of the insert constructed to carry all of such structures.

Such up and down movement of the sleeve is facilitated by the provision of piston surfaces on the sleeve to receive application of control fluid pressure and production fluid pressure respectively urging the sleeve in opposite vertical directions. In the example illustrated, the underside 70 of the head 62 provides one piston surface to receive pressure of production fluid and acting in the direction of arrow 71 in FIG. 2b to urge the sleeve upwardly. Also, such upward pressure is exerted on the lower terminal of the sleeve skirt. The top surface 72 of the head provides a piston surface to receive pressure of control fluid and acting in the direction of arrow 73 to urge the sleeve downwardly. In this regard, the head 62 of the valve means and the insert together form an expansible control chamber 74 interiorly of the insert and directly below the barrier 54 to receive control fluid pressure, the head also blocking off communication of the control chamber with the interior 85 of the sleeve. Control fluid pressure is communicated to the chamber 74 via passages 75–78 as seen in FIG. 2a, and formed by the body 14 and the insert. Passages 77 and 78 formed in the wall section 40a of the upper portion 50 of the insert; passage 75 is formed in the body 14 to communicate the annulus 79 between the inner and outer strings 15 and 16 with the passage 76; and transfer passage 76 is formed in a ring 80 mounted on the insert along with and between vertically spaced and annuluar side seal assemblies 81 and 46. The latter seal off between the body bore 49 and the insert to prevent escape of control fluid pressure. Note that the passage 75 in the body communicates with the insert passages 77 and 78 at a location adjacent the exterior of the insert upper tubular portion. Also, passage 78 does not communicate with side ports 58 in the wall of the upper portion 50 of the insert.

The insert is removably supported in the body as by the collet indicated generally at 85 in FIG. 2a. The collet is shown to include an annular portion 86 thread connected at 87 to the insert upper 40a, and spring fingers 88 extend upwardly from the portion 86. Outer lugs 89 on the spring fingers are urged outwardly on the latter for reception in the annular groove 90 formed in the body bore 49. Thus the lugs are retained between vertically spaced groove shoulders 91 and 92 when the insert is landed as by wire line in the body. Referring to FIG. 1, the insert may be lowered into the tubing via the pipe 27 when valve 26 is opened. A wire line tool attaches to the upper terminals 93 of the spring fingers to facilitate running of the insert in the tubing. Likewise, retrieval of the insert is accomplished as by lowering a wire line tool to attach to the serrations 95 on the terminals 93, the latter then being deflected inwardly to release the lugs 89 from the groove 90. One such tool seen at 96 in FIG. 2 is illustrative of the class of running and retrieving tool referred to herein.

Finally, the ring 97 on the insert is held against insert shoulder 98 by tightening of the collet portion 86 on the insert. The ring 97 also retains the side seals 81 and 46 and the transfer ported ring 80 in position on the insert. Retrieval of the insert allows replacement of all the seal assemblies described.

Referring now to FIGS. 7 and 7a, a modified insert 100 is removably received downwardly into the bore 101 of the upright tubular body 102, the latter being connected in a tubing string 103. An outer concentric tubing string 104 receives the inner string 103 and a section 104a has thread connection at 106 to the body 102.

The insert has tubular sections 105–107 defining an upper tubular portion 108 communicating with the string interior above the body 102, a lower tubular portion 110 communicable with the string interior below the body, and side porting 111 to pass the production flowing (as indicated by arrows 112 and 112a) from within the lower tubular portion to the upper tubular portion (i.e. to the interior of the body above the barrier 105a) via the flow chamber 113. The latter is formed by the recess 114 in the body 102 bore, and by the insert wall 115. As is seen, barrier 105a separates upper and lower portions 108 and 110.

The sleeve valve means 120 carried by the insert is slidable within the lower portion of the insert between a lower position as seen in FIG. 7a in which porting 111 is open, and an upper position in which the upper terminal 121 of the sleeve seats at 122 and the porting 111 is closed. In the latter position, the annular seal 123 carried by the insert seals off about the sleeve upper extent, whereas in all positions of the sleeve the seals 124 and 125 seal off between the sleeve and the insert bores 126 and 127.

The valve means includes piston surfaces 128 and 129 responsive to changes in differential pressure exerted by the production fluid (on surface 128) and by control fluid applied to surface 129 to displace the sleeve for controlling flow through the porting 111. Note that in this form of the invention, the surfaces 128 and 129 are on the head 130 integral with the sleeve and extending annularly thereof, the sleeve being open ended. Further, the expansible control chamber 131 is formed by the insert and sleeve to extend annularly about the sleeve, in inwardly spaced relation to the body more at 133. Control fluid pressure is introduced to the chamber via the interior 136 of the outer string 104a, passage 137 through the wall of the body 102, transfer passage 138 in ring 139, and passage 140 through the insert section 107. To open the sleeve, sufficient control fluid pressure is applied to chamber 131 and against surface 129 to overcome upward pressure exerted on surface 128 by the shut-in production fluid. Note the stop ring 142 carried at the lower extremity of the insert to limit downward travel of the sleeve.

The collet 143 carrying the insert is generally the same as that described in FIGS. 2 and 2a. In this regard, no seal is required to seal off between the insert and the body 102, above the flow chamber 113. All seals are carried on the insert and are therefore retrievable with the insert, without requiring pulling of the tubing.

The modification seen in FIG. 8 is generally the same as that of FIGS. 7 and 7a; however, in this form the control chamber 150 is formed between the sleeve 151 and the body 152, the sleeve skirt and head 153 projecting below the lower portion of the insert 154 that communicates via the open ended sleeve with the tubing interior below the body. Annular seal 156 seals off between the head of the valve means and the body bore 157. The piston surface 158 on the head receives upwardly exerted production fluid pressure; and piston surface 159 on the head receives downward duplication of control fluid pressure transmitted via passages 160, 161, 162 and expansible control chamber 150. Annular seal 163 seals off between the insert and the bore 164 of the body, above the transfer passage 162. Annular seals 165 and 166 respectively seal off between the slidable sleeve 151 and the insert 154, and between the sleeve and the head structure 153. Note the side porting 168 in the insert to pass the flow to the chamber 169 formed between the insert and the recessed bore 170 in the body.

The modification seen in FIGS. 9, 9a and 10 has generally the same construction as seen in FIG. 8; however, control fluid pressure is transmitted via an auxiliary control line 180 extending outside the string and between the well surface and the control chamber 150. A pump 181 at the surface supplies control fluid pressure to that line. Also, the side porting in the insert communicates via a transfer passage 182 in the body with a flow chamber 183 spaced outwardly of the insert and confined within the wall 184 of the body 185. The flow chamber passes production fluid around the insert barrier 186 and to the interior 187 of the body above the barrier.

I claim:

1. Apparatus connectable in a string of tubing in a well, comprising: an upright tubular body having an internal recess, an insert removably receivable downwardly into said body and cooperating with said recess to define a flow chamber exteriorly of the insert, the insert defining a barrier across the body interior and the insert having a lower tubular portion communicable with the string interior below said body, said insert also having side porting above and below said barrier to pass the production fluid flowing from within the lower tubular portion to the interior of the body above said barrier via the flow chamber, and valve means carried by the insert cooperating with said insert to define an expansible control chamber, said valve means having a first piston surface exposed to pressure exerted by said production fluid for displacing said valve means in one direction and a second piston surface within said expansible control chamber exposed to a control fluid for displacing said valve means in the opposite direction for controlling said production flow through said porting.

2. Apparatus as defined in claim 1, wherein the flow chamber encircles a portion of the insert.

3. Apparatus as defined in claim 1 wherein said valve means includes a sleeve movable vertically in the lower tubular portion of the insert to block and unblock production fluid flow through said side porting, said piston surfaces being on the sleeve to receive application of said control fluid pressure and production fluid pressure respectively urging the sleeve in the opposite vertical directions.

4. Apparatus as defined in claim 3 wherein the valve means and said insert form the expansible control chamber interiorly of the insert, the body and insert forming passages to communicate expansible control fluid pressure to said control chamber.

5. Apparatus as defined in claim 4 wherein the valve means includes a head on the sleeve blocking communication between said control chamber and said lower interior of the insert.

6. Apparatus as defined in claim 5 wherein said head closes one end of the sleeve.

7. Apparatus as defined in claim 5 wherein said head extends annularly of the sleeve, and including annular means sealing off between the valve means and the lower portion of the insert.

8. Apparatus as defined in claim 7, in which said control chamber extends annularly about the sleeve.

9. Apparatus as defined in claim 5 wherein said head extends annularly of the sleeve, and including annular means sealing off between the valve means and said body, said body also forming a wall of said control chamber.

10. Apparatus as defined in claim 9, in which said control chamber extends annularly about the sleeve.

11. Apparatus connectable in a string of tubing in a well, comprising: a tubular body having an internal recess, an insert axially movable into said tubular body and cooperating with said recess to define a flow chamber within the tubular body and exteriorly of said insert, means within said insert defining a barrier across the interior of the body, said insert having side porting above and below said barrier communicating with said flow chamber and with the interior of the string below the tubular body whereby production fluid in the string below the body may pass outward through the side porting into said flow chamber and back into the interior of said insert, valve means carried by said insert for controlling the flow of production fluid through said porting, said valve means cooperating with said insert to define an expansible control chamber, said valve means having a first piston surface exposed to pressure exerted by said production fluid for moving the valve means in one direction and a second piston surface within the expansible control chamber for moving said valve means in the opposite direction, and means including a passage in the body for subjecting said expansible control chamber and said second piston surface to pressure of a control fluid.

12. Apparatus connectable in a string of tubing in a well, comprising: an upright tubular body having an internal recess, an insert axially movable into said tubular body and cooperating with said recess to define a flow chamber within the tubular body and exteriorly of said insert, means within said insert defining a barrier across the interior of the body, said insert having axially spaced side porting both above and below said barrier, communicating with said flow chamber, the side porting below the barrier communicating with the interior of the string below the tubular body whereby production fluid in the string below the body may pass outward through the side porting into said flow chamber and back into the string above the barrier, valve means carried by said insert for controlling the flow of production fluid through said porting, said valve means cooperating with said insert to define an expansible control chamber, said valve means having a first piston surface exposed to pressure exerted by said production fluid for moving the valve means in one direction and a second piston surface within the expansible control chamber for moving said valve means in the opposite direction, and means including communicating passages in the body and the insert for subjecting said expansible control chamber and said second piston surface to pressure of a control fluid.

13. The combination set forth in claim 12 wherein the valve means comprises a tubular valve sleeve closed at its upper end and having lateral ports for flow of production fluid therethrough, and wherein said passage in the insert communicates with the interior of the insert below said barrier.

14. Apparatus connectable in a string of tubing in a well, comprising: a tubular body having an internal recess, an insert axially movable into said tubular body and cooperating with said recess to define a flow chamber within the tubular body and exteriorly of said insert, means within said insert defining a barrier across the interior of the body, said insert having side porting below said barrier communicating with said flow chamber and with the interior of the string below the tubular body whereby production fluid in the string below the body may pass outward through the side porting into said flow chamber, valve means carried by said insert for controlling the flow of production fluid through said porting, said valve means comprising a tubular valve sleeve open from end to end for flow of production fluid therethrough, said valve means having a first annular piston surface exposed to pressure exerted by said production fluid for moving the valve means in one direction and a second annular piston surface for moving said valve means in the opposite direction, and means including a passage in the body for subjecting said second piston surface to pressure of a control fluid.

References Cited

UNITED STATES PATENTS

| | | | |
|---|---|---|---|
| 3,411,584 | 11/1968 | Sizer et al. | 166—72 |
| 3,412,806 | 11/1968 | Fredd et al. | 166—72 |
| 2,351,322 | 6/1944 | Crake | 166—72 |
| 2,963,089 | 12/1960 | Sizer | 166—72 |
| 3,002,566 | 10/1961 | Bostock | 166—224 |
| 3,216,501 | 11/1965 | Page | 166—72 |
| 3,294,174 | 12/1966 | Vincent | 166—224 |

CHARLES E. O'CONNELL, Primary Examiner

IAN A. CALVERT, Assistant Examiner

U.S. Cl. X.R.

251—63